July 6, 1954 G. H. ENNIS ET AL 2,682,800
PHOTOELECTRIC WATER LOCATING INSTRUMENT
Filed Aug. 25, 1951
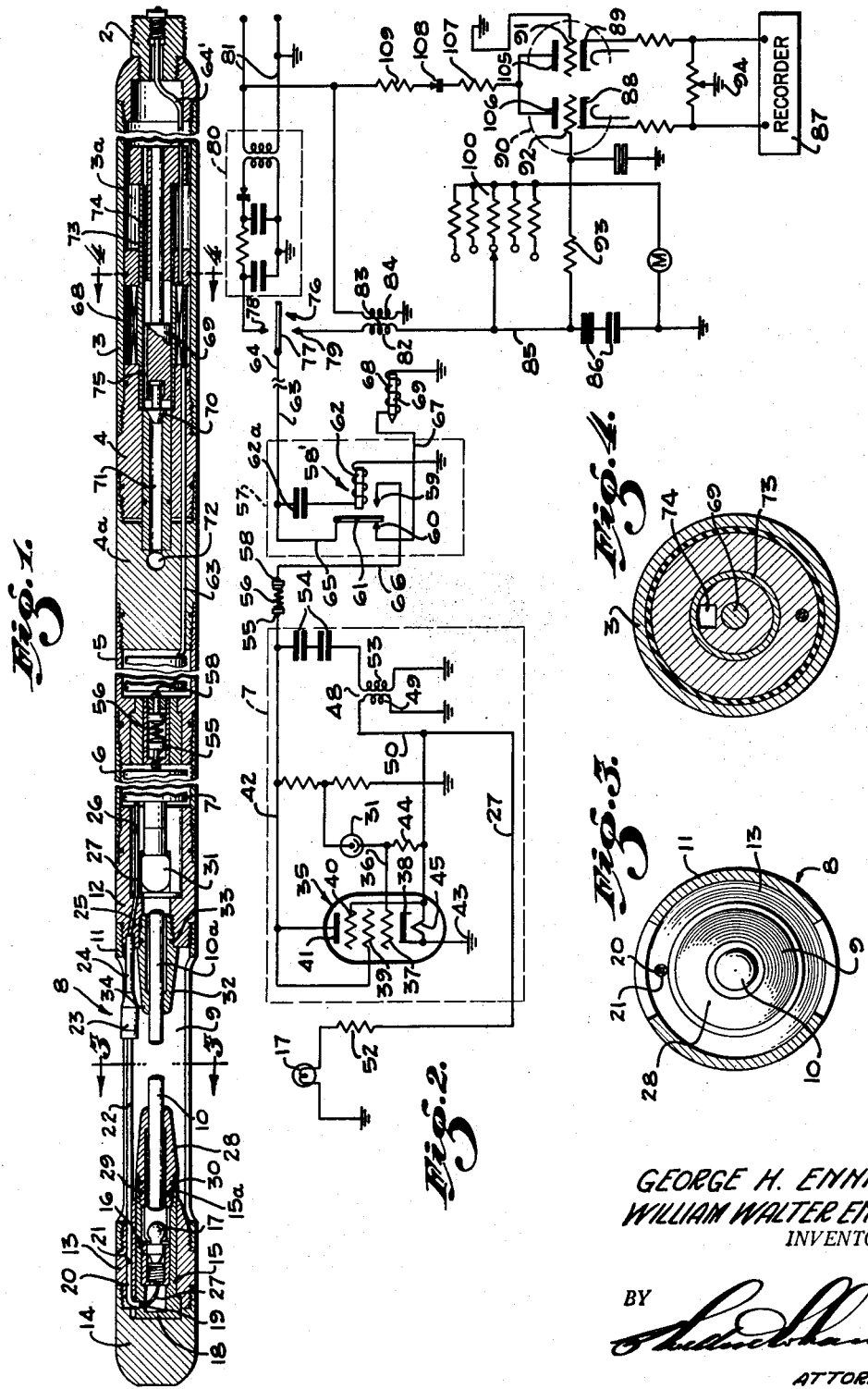
GEORGE H. ENNIS,
WILLIAM WALTER ENNIS,
INVENTORS.
BY
ATTORNEY Patented July 6, 1954

2,682,800

UNITED STATES PATENT OFFICE 2,682,800

PHOTOELECTRIC WATER LOCATING INSTRUMENT

George H. Ennis and William Walter Ennis, Long Beach, Calif.; said William W. Ennis assignor to Robert V. Funk, Long Beach, Calif.; Julia F. Ennis, executrix of said George H. Ennis, deceased Application August 25, 1951, Serial No. 243,712

2 Claims. (Cl. 88—14)

Our invention relates to the art of determining the point or points of entry of water into wells and of tracing the direction and rate of movement of water which has entered the well.

It is an object of the present invention to provide a photo-electric water locating instrument of such small diameter and slender form that it may be lowered into a well and employed therein during normal activity of the well, thereby making it possible to determine points of entry and relative volumes of water entry during the time the well is producing under normal conditions. The instrument may be made of a diameter less than two inches and therefore may be lowered into a producing well through the space between the oil tubing and the casing, or if the well is flowing under its own head the instrument may be lowered through the oil tubing.

It is an object of the invention to provide a water locating instrument having an optical system of high efficiency and also having a light source of large capacity considering the small diameter of the shell which contains the functioning parts of the instrument.

It is a further object of the invention to provide a water locating instrument which avoids the use of batteries as a power source for the light and wherein the lenses of the optical system are fused to the metal supports therefor to effect a fluid seal without reducing the lens aperture.

Further objects and advantages of the invention may be brought out in the following part of the specification wherein we have described small details of a preferred embodiment of the invention, for purpose of disclosure, without intent to limit the scope of the invention set forth in the appended claims. Referring to the drawings which are for illustrative purposes only:

Fig. 1 is a fragmentary sectional view of a preferred embodiment of the invention;

Fig. 2 is a wiring diagram showing the electrical parts of the invention, with some parts of the diagrammatically shown electrical apparatus disposed approximately adjacent the positions which they occupy in the embodiment shown in Fig. 1;

Fig. 3 is a cross-section, to enlarged scale, taken as indicated at the line 3—3 in Fig. 1; and Fig. 4 is a cross-section, to enlarged scale, taken as indicated at the line 4—4 in Fig. 1.

The shell of the instrument shown in Fig. 1 has at its upper end a cable attachment 2 to which a tube 3 is connected, this tube forming a reservoir for dye or other conditioning fluid. By means of fittings 4 and 4a a tubular relay housing 5 is connected to the lower end of the tubular member 3. A tube 6 is connected to the lower end of the housing 5 to form a receptacle for an electrical unit 7. An optical unit 8 is secured to the lower end of the tube 5, this optical unit being of tubular or cylindrical form and having an aperture 9 extending diametrally so that fluid from the well into which the instrument is lowered may pass into the space between lenses 10 and 10a.

The optical unit 8 includes a tube 11 which is connected to the tube 6 by use of a threaded fitting 12. A short sleeve fitting 13 is threaded into the lower end of the tube 11 and is adapted to receive a threaded cap 14 arranged to hold in the sleeve 13 a removable support 15 which carries a lamp socket 16 positioned so that it will support an electric lamp 17 adjacent the inner end of the lens 10. The support 15 is closed at its lower end by a wall 18, and near this wall 18 has a radial opening 19 to which a metal tube 20 of small diameter is connected. Adjacent the point at which it is connected to the support 15, the tube 20 is bent so that it will lie parallel to the axis of the optical unit 8 and therefore may pass through an opening 21 drilled longitudinally in the sleeve fitting 13.

When the tube 20 is passed through the opening 21 in the manner described in the foregoing its upper end 22 may be caused to pass into a packing gland 23 supported by a tubular part 24 which projects downwardly from the fitting 12 in radially offset relation to the lens 10a. The upper end of the tubular part 24 communicates through a hole 25 with the interior space 26 of the fitting 12. For energization of the lamp 17 an insulated conductor 27 is extended down through the opening 25, the tubular part 24, the tube 20 and the radial opening 19 where it is connected to the internal contact of the lamp socket 16, details of which are not shown for the reason that it follows standard practice. The opening 19 at the lower end of the support 15 is closed by the tube 20. The remaining opening at the upper end of the support 15 is closed by a lens holder 28 having an externally threaded boss 29 which projects into opening 15a and is provided with a sealing ring 30.

The lens 10a is supported in axial alignment with a photo-electric cell 31 by a lens holder 32 which threads into the lower end of the tubular fitting 12 and carries an annular seal 33. The holders 28 and 32 are substantially identical and have constricted portions 34 near their outer ends which are connected to the cylindrical surfaces of the lenses 10 and 10a by fusion of the metal with the glass of the lenses. The photoelectric cell 31 is supported at the lower end of the electrical unit 7 which, as shown in the electrical diagram, Fig. 2, has an electronic tube 35 arranged not only to serve as a half wave rectifier but also as an amplifier for the photoelectric cell 31, one terminal of which is connected through a conductor 36 with a grid 37 of the tube 35. The tube 35 is a pentode wherein the control grid 37 is disposed between the cathode 38 and the screen grid 39. The tube 35 has the customary cathode grid 40, and has a plate 41. The conductor 36 is connected to a ground 43 through a resistor 44. The tube 35 has a heater element 45 which is supplied with current by transformer 48. One side of the secondary coil 49 of the transformer is grounded and the remaining terminal of the secondary coil 49 is connected through a conductor 50 with the heater element 45. For energization of the lamp 17, the secondary coil 49 is connected through the conductor 50, a conductor 51 and a control resistor 52 with the conductor 27 which extends to the tube 20 and makes contact with the live terminal of the lamp socket 16. The primary winding 53 of the transformer 48 is connected through series condensers 54 with a conductor 42.

The upper end of the conductor 42 is connected to a terminal contact 55 which projects from the upper end of the electrical unit 7 so as to engage the lower end of an axially yieldable connector 56 which is supported in the lower end of the relay housing 5. A relay unit 57 is disposed in the housing 5, this relay unit being of cylindrical form and having a contact 58 at its lower end which engages the spring contact means 56. As shown in Fig. 2 the relay unit 57 includes a relay 58' having spaced contacts 59 and 60 arranged to be alternately engaged by a movable contact 61. An electromagnet 62 is arranged so that when it is energized it will move the contact 61 from engagement with the contact 60 into engagement with the contact 59. A direct current blocking condenser 62a connects the winding of the electromagnet 62 with a conductor 63 which is carried up from the relay unit 57 through the parts 4a, 4, 3 and 2 to make contact in any of the well known manners with the conductor 64 of the cable 64' employed to support the water locating instrument in the well.

As further shown in Fig. 2, a conductor 65 connects the movable contact 61 with the conductor 63, a conductor 66 connects the contact 59 with the terminal contact 58 at the lower end of the relay unit 57 which engages the spring contact means 56, and a conductor 67 connects the contact 60 with a solenoid 68 disposed within the tube 3. The solenoid 68 is arranged to attract upwardly an armature 69 which has its lower end connected to a valve closure 70 which is arranged, when in lowered position to close an outlet passage 71 arranged to provide communication of the reservoir 3a within the tube 3 with a lateral outlet port 72 formed in the fitting 4a. The armature 69 is carried in a guide 73 which extends through the solenoid 68, the guide 73 and the armature 69, respectively, having channels 74 and 75 therein through which dye from the reservoir 3a may pass to and through the passage 71 when the valve closure 70 is raised.

Electrical system of the invention has, for use at the top of the well energizing and recording apparatus provided with a double throw switch 76 having a movable contact 77 which is connected to the upper end of the cable conductor 64 and stationary contacts 78 and 79. The contact 78 is connected to a heavy duty direct current source 80 arranged to be energized by alternating current from an A. C. supply system 81. The contact 79 is connected to one side of the secondary winding 82 of a transformer 83, the primary winding 84 of which is connected to the A. C. supply system 81. The remaining side of the secondary winding 82 is connected through a conductor 85 and capacitors 86 with ground. When the movable contact 77 is moved to engage with contact 79, the alternating current current source 83 will energize the winding of the solenoid 62 so that the movable contact 61 will be brought into engagement with the stationary contact 59 so that the circuit will be carried through the conductor 66 and the conductor 42 to the electrical parts contained in the electrical unit 7. The current flow through the tube 35 will, however, be a rectified, half-wave of a current strength controlled by the potential applied to the control grid 37 of the tube 35 by the photoelectric cell 31. The current variation resulting from the control of the tube 35 by the photo-electric cell is indicated and recorded by a recorder 87 which is bridged across the cathodes 88 and 89 of a dual triode tube 90 having one control grid 91 grounded and having the other control grid 92 thereof connected through a resistor 93 with the conductor 85. The dual triode 90 is energized from the A. C. supply through connection of its cathodes 88 and 89 with ground 94, and connection of its plates 105 and 106 through a resistor 107, a rectifier 108 and a resistor 109 with the ungrounded conductor of the A. C. supply system 81. A resistor network 100 is bridged across the capacitors 86 to provide a controllable shunt to vary the sensitivity of the recording section of the electrical apparatus.

The photo-electric cell 31 is selected so as to have a maximum sensitivity within that portion of the spectrum having greatest efficiency with the particular dye which has been chosen. If necessary a filter may be used to confine this sensitivity to the range desired. If the photoelectric cell 31 responds to a wide range of light values, a filter may be placed either to the left or to the right of the space between the confronting ends of the lenses 10 and 10a. The dye is selected with relation to the selected portion of the spectrum so that the presence of the dye in the space between the lenses 10 and 10a will absorb or block the light which is capable of activating the photo-electric cell. The advantage of using a filtering dye in well water locating operations is very great. For example, we may use the infrared portion of the spectrum and Nigrosine may be used as the dye. Only fifty parts of Nigrosine per million parts of water is necessary to completely absorb the infrared rays. Present methods of water locating require a ratio of one part of the conditioning substance to forty-two parts of well water.

In view of the very small amount of conditioning fluid required in the operation of our new device, superior results are obtained in the testing of well for water entry while the well is pumping normally. The instrument is run down into the well through the annular space between the tubing and the casing and a number of tests may be made over an extended period of time without the necessity of pulling the instrument to the surface. In many cases the production of the well varies considerably from hour to hour, and a true picture of water entry conditions can be obtained only by making a number of consecutive tests.

The operation of the device is carried on as follows. As the instrument is lowered into the well the movable contact 77 of the switch 76 is maintained in a centralized position as shown in Fig. 2. When the bottom of the zone of the well to be tested is reached, contact 76 is moved into engagement with contact 78 and direct current will flow from the source 80 through switch contacts 61 and 60 and the solenoid windings 68, energizing the same so as to open the valve 70. Then, as the instrument is moved upward in the well, dye will flow out through the lateral opening 72 and condition the fluid in the well. When the upper end of the zone is reached, the contact 77 is moved into engagement with the contact 79, closing the alternating current circuit which includes the solenoid 62 of the relay 58. This will swing the contact 61 into engagement with the contact 59 so that alternating current may flow to the electrical unit 7 and also effect energization of the lamp 17. If the water entering the space between the lenses 10 and 10a has dye therein, the energization of the photo-electric cell will be reduced or entirely blocked as the result of absorption of the selected portion of the spectrum by the dye. Where water enters the well, it displaces water containing the dye and when the optical unit 8 of the instrument is passed through the relatively clear water which has entered the well, water containing dye will be displaced from the space between the lenses 10 and 10a, permitting light to pass to and activate the photo-electric cell, permitting a flow of current through the circuit members which include the electrode and screen of the cell, this current flow acting in the tube 35 to modulate the half wave signal carried to the surface of the ground where it is in turn indicated by the recorder 87. Ordinarily a recorder is employed having a paper strip marked off so as to indicate the depth of the instrument in the well. A number of record strips from the recorder 87, placed in side by side relation, will readily show any variations in water entry existing at the different times at which the records were made.

We claim:

1. In a testing device of the character described: a hollow body arranged to be moved from place to place in the conduct of a test, said body having a reservoir for conditioning fluid and discharge means for the conditioning fluid adapted to be operated by direct current; an electric lamp and a photo-electric cell spaced apart on said body so as to define an intervening space to receive fluid to be tested; conductor means forming an electric circuit extending to said body; means connecting said circuit with said discharge means; means for connecting a source of direct current to said circuit so as to actuate said discharge means; means for connecting a source of alternating current to said circuit; transformer means connected to said circuit for energizing said lamp from said alternating current; an electronic tube in said body connected to said conductor means so as to act as a valve passing a half wave of said alternating current, said tube having a control grid; means connecting said photo-electric cell to said control grid so that said half wave will be thereby modulated in accordance with the light received by said cell from said lamp; relay means acting to disconnect said discharge means from said circuit in response to flow of said alternating current in said circuit; and indicating means connected to said circuit so as to receive said half wave, said indicating means being responsive to the modulation of said half wave and indicating reception of light by said cell.

2. In a testing device of the character described: a hollow body arranged to be moved from place to place in the conduct of a test, said body having a reservoir for conditioning fluid and discharge means for the conditioning fluid comprising a valve and a valve operating solenoid adapted to be operated by direct current; an electric lamp and a photo-electric cell spaced apart on said body so as to define an intervening space to receive fluid to be tested; conductor means forming an electric circuit extending to said body; means connecting said circuit with said solenoid; means for connecting a source of direct current to said circuit so as to actuate said solenoid; means for connecting a source of alternating current to said circuit; transformer means connected to said circuit for energizing said lamp from said alternating current; an electronic tube in said body connected to said conductor means so as to act as a valve passing a half wave of said alternating current, said tube having a control grid; means connecting said photo-electric cell to said control grid so that said half wave will be thereby modulated in accordance with the light received by said cell from said lamp; relay means acting to disconnect said solenoid from said circuit in response to flow of said alternating current in said circuit; and indicating means connected to said circuit so as to receive said half wave, said indicating means being responsive to the modulation of said half wave and indicating reception of light by said cell.

References Cited in the file of this patent

UNITED STATES PATENTS

| Number | Name | Date |
| --- | --- | --- |
| 1,746,616 | Sounitza | Feb. 11, 1930 |
| 1,958,252 | Singleton et al. | May 8, 1934 |
| 2,203,720 | Dale | June 11, 1940 |
| 2,283,429 | Ennis | May 19, 1942 |
| 2,317,039 | Ennis | Apr. 20, 1943 |
| 2,581,979 | Standing et al. | Jan. 8, 1952 |